United States Patent
Portegys et al.

(10) Patent No.: US 9,235,801 B2
(45) Date of Patent: Jan. 12, 2016

(54) MANAGING COMPUTER SERVER CAPACITY

(71) Applicant: Citrix Systems, Inc., Fort Lauderdale, FL (US)

(72) Inventors: Thomas Portegys, Duvall, WA (US); William DeForeest, Snohomish, WA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 225 days.

(21) Appl. No.: 13/835,294

(22) Filed: Mar. 15, 2013

(65) Prior Publication Data

US 2015/0026108 A1    Jan. 22, 2015

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 3/08* | (2006.01) |
| *G06F 9/50* | (2006.01) |
| *G06N 3/04* | (2006.01) |
| *H04L 29/08* | (2006.01) |
| *G06N 99/00* | (2010.01) |
| *G06N 3/02* | (2006.01) |

(52) U.S. Cl.
CPC .............. *G06N 3/08* (2013.01); *G06F 9/5083* (2013.01); *G06N 3/04* (2013.01); *H04L 67/1002* (2013.01); *G06N 3/02* (2013.01); *G06N 3/049* (2013.01); *G06N 99/005* (2013.01)

(58) Field of Classification Search
None
See application file for complete search history.

(56) References Cited

U.S. PATENT DOCUMENTS 5,704,012 A    12/1997   Bigus
8,086,596 B2 *  12/2011   Bernardini et al. ........... 707/713
(Continued)

OTHER PUBLICATIONS

A predictive and probabilistic load-balancing algorithm for cluster-based web servers Saeed Sharifiana,* , Seyed A. Motamedia, Mohammad K. Akbarib © 2010 Elsevier B.V. All rights reserved.*
(Continued)

*Primary Examiner* — Ben Rifkin
*Assistant Examiner* — Ababacar Seck
(74) *Attorney, Agent, or Firm* — Banner & Witcoff, Ltd.

(57) ABSTRACT

Systems and methods are disclosed for using machine learning (e.g., neural networks and/or combinatorial learning) to solve the non-linear problem of predicting the provisioning of a server farm (e.g., cloud resources). The machine learning may be performed using commercially available products, such as the SNNS product from The University of Stuttgard of Germany. The system, which includes a neural network for machine learning, is provided with an identification of inputs and outputs to track, and the system provides correlations between those. Rather than static rules, the machine learning provides dynamic provisioning recommendations with corresponding confidence scores. Based on the data collected/measured by the neural network, the provisioning recommendations will change as well as the confidence scores.

19 Claims, 16 Drawing Sheets

(56) References Cited

U.S. PATENT DOCUMENTS

| | | | |
|---|---|---|---|
| 8,171,134 B2 * | 5/2012 | Chen et al. | 709/224 |
| 8,635,328 B2 * | 1/2014 | Corley et al. | 709/224 |
| 2002/0147937 A1 | 10/2002 | Wolf | |
| 2005/0060391 A1 | 3/2005 | Kaminsky et al. | |
| 2007/0018991 A1 | 1/2007 | Hsu | |
| 2012/0101968 A1 * | 4/2012 | Banerjee et al. | 706/21 |
| 2012/0185416 A1 | 7/2012 | Baras et al. | |
| 2013/0091543 A1 | 4/2013 | Wade et al. | |

OTHER PUBLICATIONS

Stuttgart Neutral Network Simulator, Developed by University of Stuttgart, Maintained at University of Tubingen, (Fr. Jan. 20, 1995) © 1993, 1994, Nikos Drakos, Computer Based Learning Unit, University of Leeds, pp. 1-369.

PCT International Search Report for International Application No. PCT/US2014/027927, mailed Jun. 26, 2014, 13 pages.

* cited by examiner

MANAGING COMPUTER SERVER CAPACITY

TECHNICAL FIELD

This application generally relates to managing computer server capacity. In particular, this disclosure relates to learning and predicting computer server capacity to load balance sessions among one or more computers.

BACKGROUND

Providing end users with shared resources in an operating environment can present capacity planning challenges. The end-user experience is optimized when the systems can ensure that resources are delivered to users in a prompt and reasonable amount of time such that overloading is avoided. When a system is overloaded or otherwise not properly load balanced, the system may be unable to provide a user with the required resources in a reasonable amount of time thereby decreasing an end user's user-experience. There are many challenges associated with trying to forecast and plan for the amount of resources required by a particular user. Existing load balancing systems fail to adequately address these challenges.

For example, at any point in time, a user could require more or less resources. Moreover, users may not consume these resources constantly but rather their consumption amounts and periods may vary as applications are updated, additional applications are installed, or user behavior changes. In addition, the challenges can be exacerbated when multiple user sessions or users share a common pool of hardware resources. It is often difficult to predict how many users a physical computer, server, or other infrastructure can support. In some instances, administrators can determine the amount of hardware allocated to each workload a priori. This existing solution in inadequate and has shortcomings.

Meanwhile, a branch of computer science exists called computational learning theory (CLT), in which machine learning algorithms and their performance are analyzed. The performance of a CLT algorithm can greatly vary; some algorithms can be completed within a fixed amount of time, while others may have probabilistic bounds. In addition, the time complexity of a CLT algorithm can have positive or negative results, depending on whether the functions of the algorithm can be learned in polynomial time or not, respectively. CLT algorithms may sometimes be implemented using an artificial neural network (e.g., a connectionist model).

The Stuttgart neural network simulator (SNNS) is a simulator for neural networks developed at the Institute for Parallel and Distributed High Performance Systems at the University of Stuttgart. The SNNS simulator 200 consists of four main components: simulator kernel, graphical user interface, batch execution interface (e.g., batchman), and network compiler (e.g., snns2c, which takes some inputs and generates a trained network file as C source code). Referring to FIG. 2, the simulator kernel component operates on internal network data structures of the neural networks and performs operations on them. The graphical user interface, which may be built on top of the kernel, gives a graphical representation of the neural networks and controls the kernel during the simulation run, including the ability to directly create, manipulate, and visualize complex neural networks in various ways.

The SNNS user guide explains that in artificial neural networks (e.g., connectionist models), "knowledge is usually distributed throughout the net and is stored in the structure of the topology and the weights of the links. The networks are organized by (automated) training methods, which greatly simplify the development of specific applications. Classical logic in ordinary [artificial intelligence] AI systems is replaced by vague conclusions and associative recall (exact match vs. best match). This is a big advantage in all situations where no clear set of logical rules can be given. The inherent fault tolerance of connectionist models is another advantage. Furthermore, neural nets can be made tolerant against noise in the input: with increased noise, the quality of the output usually degrades only slowly (graceful performance degradation)." Although simulators exist for neural networks, their practical application outside of academia/universities is limited, particularly in the area of server capacity planning.

SUMMARY OF THE DISCLOSURE

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

This disclosure describes methods and systems for managing the capacity of one or more servers under a varying load. An illustrative system may comprise a data store storing load and health measurements, one or more processors, and a memory storing various modules that, when executed by a processor, cause the management of capacity of a plurality of server machines. A neural network may be used to accept corresponding load and health measurements as inputs, and calculate a relationship (e.g., correlation, cause-effect, etc.) between those inputs using a learn module. Moreover, a predictor module may generate a predicted health of the plurality of server machines using the neural network. In addition a simulator module may be used in accordance with various aspects of the disclosure to further enhance the updating of the neural network and management of server capacity.

In another embodiment in accordance with aspects of the disclosure, an apparatus is disclosed comprising a computer processor and a tangible, non-transitory computer memory storing computer-executable instructions, which when executed by the processor, causes the computer system to perform one or more of the steps described herein. In an alternate embodiment the computer memory may be wholly or partially located in a data storage system. The details of these and other embodiments of the present disclosure are set forth in the accompanying drawings and the description below. Other features and advantages of the disclosure will be apparent from the description and drawings and from the claims. Of course, the methods and systems of the above-referenced embodiments may also include other additional elements, steps, computer-executable instructions or computer-readable data structures.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION

Systems and methods are disclosed for using machine learning (e.g., neural networks and/or combinatorial learning) to solve the non-linear problem of predicting the provisioning of a server farm (e.g., cloud resources). The machine learning may be performed using commercially available products, such as the SNNS product from The University of Stuttgart of Germany The system, which includes a neural network for machine learning, is provided with an identification of inputs and outputs to track, and the system provides correlations between those. Rather than static rules, the machine learning provides dynamic provisioning recommendations with corresponding confidence scores. Based on the data collected/measured by the neural network, the provisioning recommendations will change as well as the confidence scores.

Some of the methods disclosed here use observations of statistical fluctuations in actual usage as a means of prediction. These fluctuations occur for various reasons, such as (1) regular variations such as daily, weekly and seasonal usage, (2) trending variations due to changes in customer demand, (3) sporadic variations due to outages and anomalous events, (4) server machine upgrades, (5) applications being added/removed/new versions; (6) application usage varies due to changing organization; and others. Some of methods disclosed are for determining the performance of a computer system as a function of a process load, where the load can originate from various executables run by various users. The uppermost satisfactory performance may define the capacity of the system. Performance can also be predicted from hypothetical loads. In addition, historical measurements of server and process performance during fluctuations may be mined to learn what will happen when performance behavior that is observed under peak or reduced load conditions becomes the average. For example, if a special event causes the number of users to jump dramatically, measurements of process and server performance during that time may be mined to accurately predict what the performance will be for a future influx of new users or an increase usage due to expansion of services offered to existing users. In another example, measurements during a regular server maintenance period during which capacity is reduced may be mined to determine process performance if servers are retired or powered down for energy conservation reasons.

As an overview, the system correlates server load with server health to identify a causal relationship during the learning steps using the learn module. In one embodiment, the machine learning module (e.g., learn module) may be implemented using an artificial neural network. In another embodiment, the machine learning module may be implemented using a K-nearest neighbor (kNN) classifier. In yet another embodiment, the learning module may be implemented using both an artificial neural network and a K-nearest neighbor (kNN) classifier.

Figure 1A:
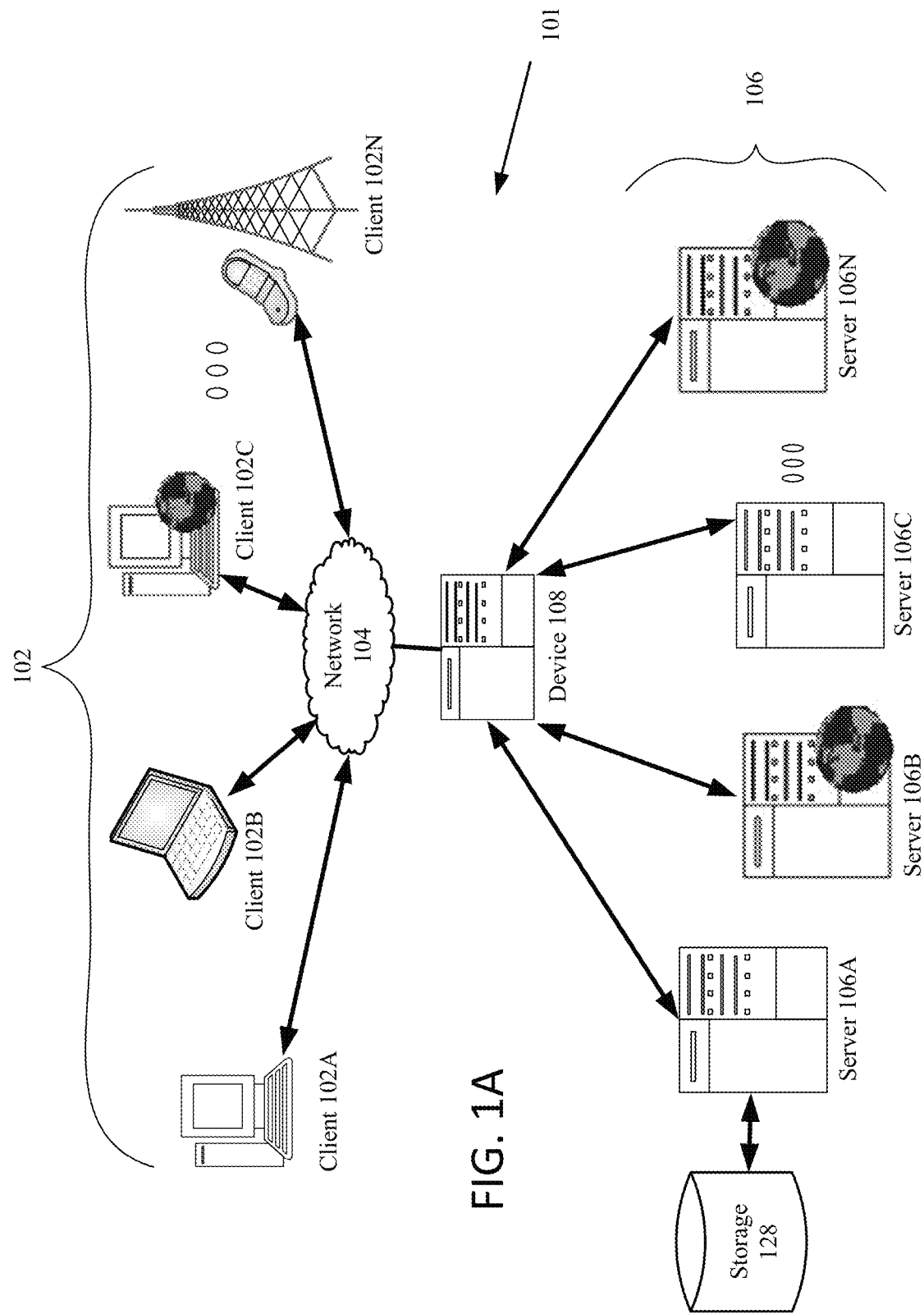
FIG. 1A depicts embodiments of network environments that provide remote access to computing devices that can execute application programs.

Overview of Illustrative Computing Environment. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network. In some embodiments, the computing environment 101 may include a load balancer device (e.g., device 108) installed between the server(s) 106 and client machine(s) 102. This load balancer device 108 can manage client/server connections, and in some cases can load balance client connections amongst a plurality of backend servers. In other embodiments, the functionality of the load balancer device 108 may be conflated into server 106A and offers through that device.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can include a virtual machine 102C. The virtual machine 102C can be any virtual machine, while in some embodiments the virtual machine 102C can be any virtual machine managed by a hypervisor developed by XenSolutions, Citrix Systems (e.g., Xen hypervisor), IBM, VMware, Microsoft (e.g., Hyper-V), EMC (e.g., ESX) or any other hypervisor. In other embodiments, the virtual machine 102C can be managed by any hypervisor, while in still other embodiments, the virtual machine 102C can be managed by a hypervisor executing on a server 106 or a hypervisor executing on a client 102. In various embodiments in accordance with this disclosure, a hypervisor may be an abstraction layer that supports running multiple instances of operating systems, each of which may be a virtual machine. One of those virtual machines may manage the physical device on which the hypervisor is executing. In some examples, each of these virtual machines may be optionally referred to as "domains," and the management domain may be referred to as "Dom 0" or "Domain 0".

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc.

Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
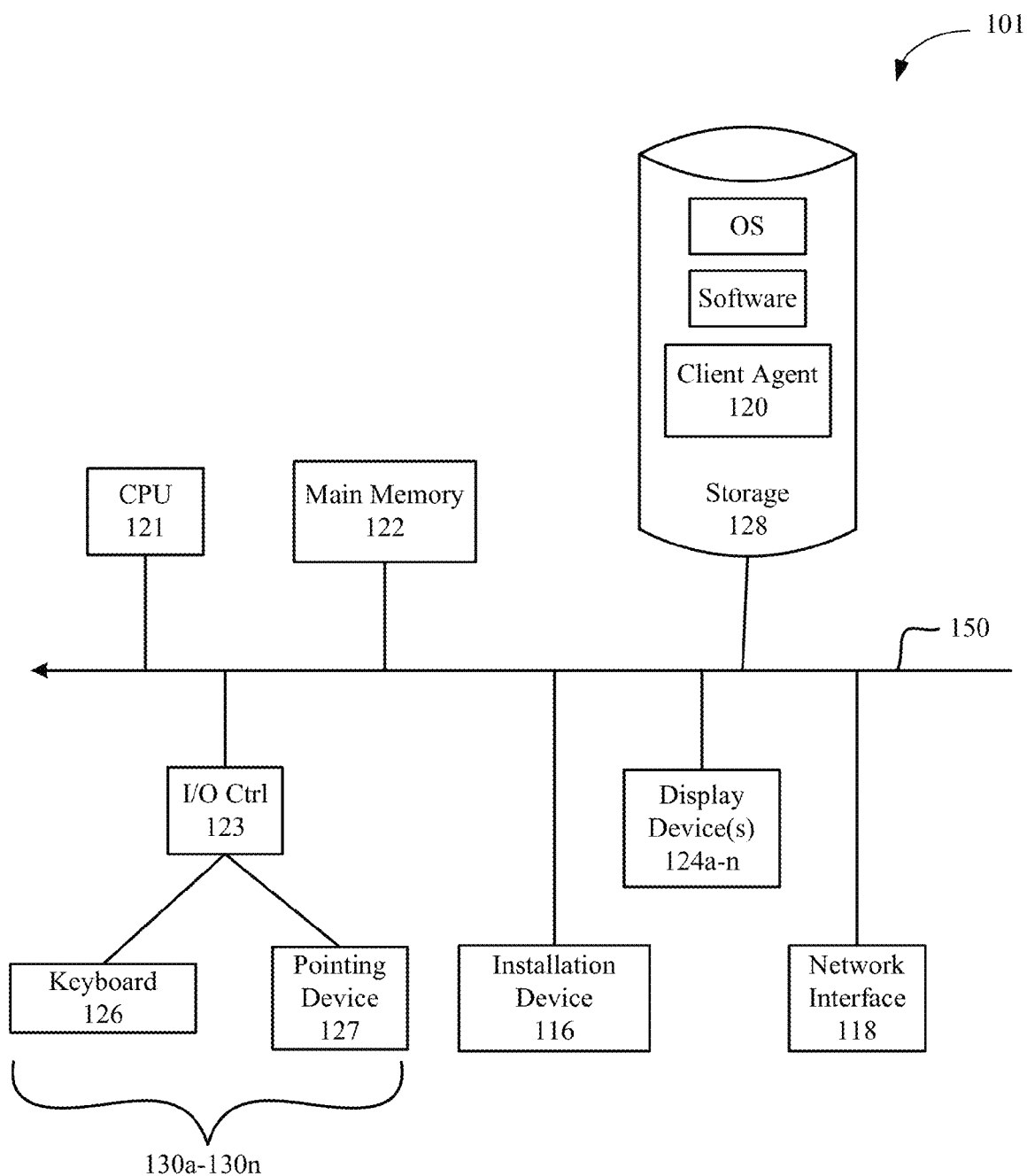
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
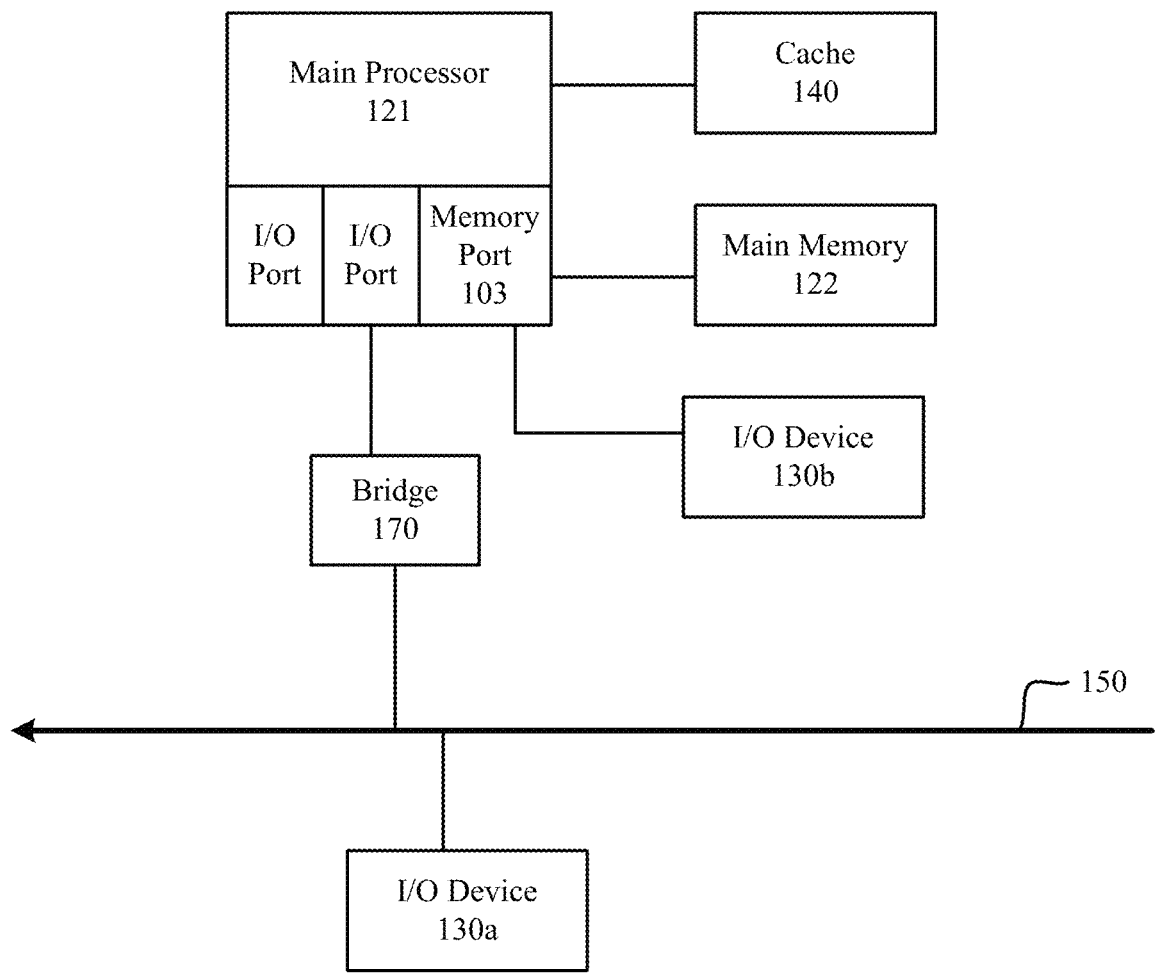

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (PRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a boatable medium, a boatable CD, a boatable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device. Reference to specific products, services, hardware, and/or software herein is not meant to be limiting, but instead is illustrative in each circumstance of a genre of solutions that may be used in one or more embodiments as described herein.

Figure 4:
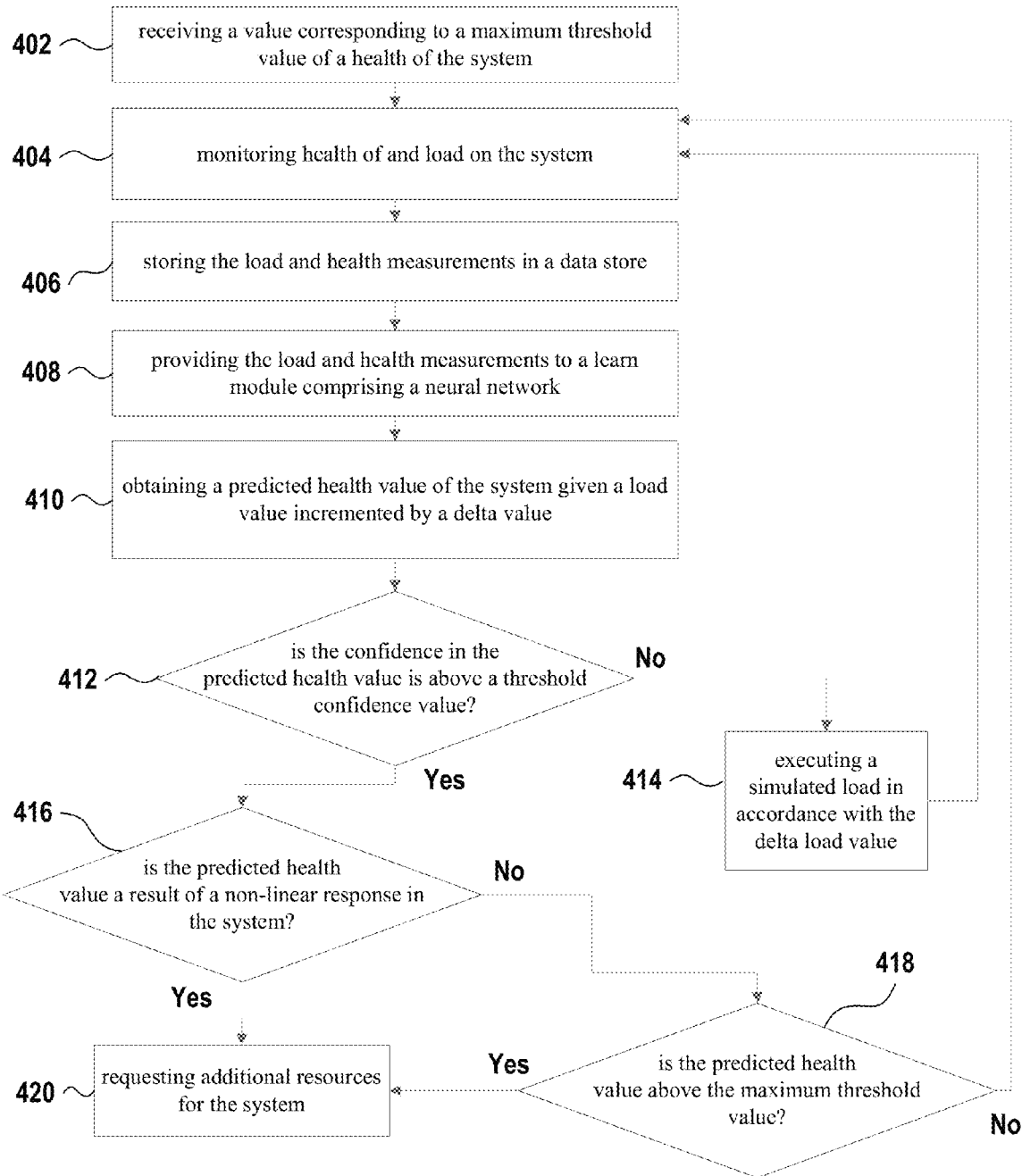
FIG. 4 is a flowchart of an illustrative method of learning and predicting the performance of one or more server machines using an illustrative artificial neural network in accordance with various aspects of the disclosure.

Regarding FIG. 4, a flowchart is disclosed illustrating a method of learning and predicting the performance of one or more server machines as a function of a hypothetical, future load for capacity planning.

In step 402, a computing device 106A may send a value corresponding to a maximum threshold value desired for the health of a system of one or more server machines 106 (e.g., server cloud). The maximum threshold value may have been entered by a network administrator or other person/system to identify particular characteristics of the system that are desirable. These performance metrics that are used to determine how well a system is behaving are referred to as the health of the system. For example, an administrator may define a healthy system as one in which the time for a particular application to launch is less than a predetermined duration of time. This "application launch time" attribute may be desirable to be kept low, thus users of the system are not left waiting for a long duration for applications to launch. The maximum threshold value may be received by the system and stored in computer memory 122 for use with the various modules and components disclosed herein. Other examples of attributes that may be used to define a healthy system include, but are not limited to, the amount of time it takes for a user's request to be fulfilled and a confirmation response to be sent to the user, and processor utilization.

In step 404, a capacity prediction and learning server 106A may monitor the health of and load on the system of one or more server machines 106B-106N. In one example, the health of the system may be measured (using module 303) through an "application launch time" characteristic and a "roundtrip request time" characteristic. Meanwhile, the load of the system may be measured, using module 302 in one example, through one or more of the combination of processor utilization percentage, memory usage, and/or input-output (I/O) usage. The system is contemplated to be generally equipped to handle a variety of different load types. Operating systems and other tools (e.g., Citrix Edgesight™) are capable of measuring and providing the processor, memory, and I/O consumption rates for processes running executables on the system 106B-106N. The measured health and load values may be associated and stored (in step 406) in a data store 128. In some examples, the values may be the average resource consumption rates over a predetermined period of time; and as such, using these averages, the load of the system may be defined as a triple which is (using module 301) the aggregated sums of the processor (e.g., CPU), memory, and I/O consumption rates of all the processes in the system 106B-106N.

Figure 3A:
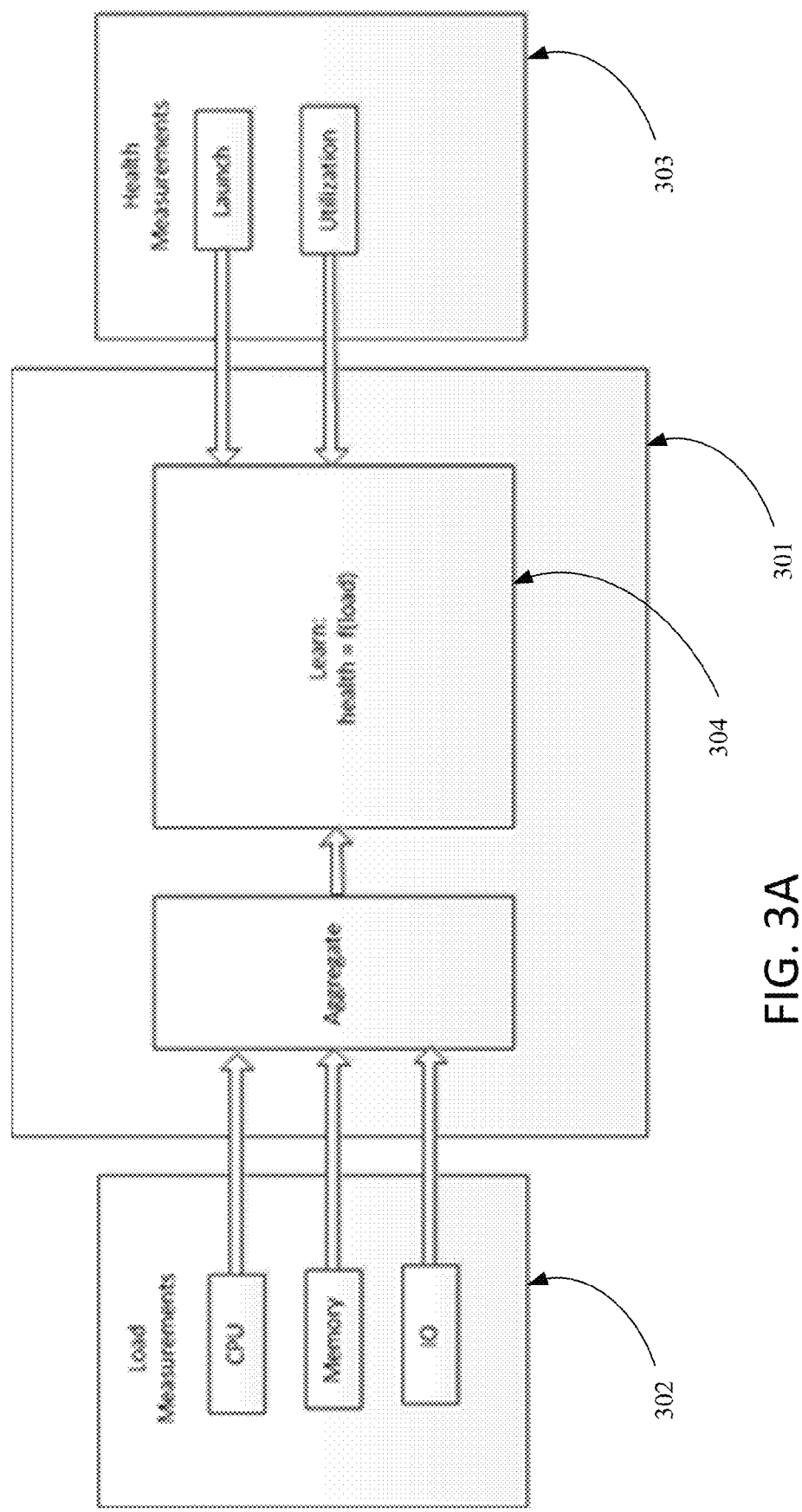
FIG. 3A is a block diagram of components in a learning engine in accordance with various aspects of the disclosure.
Figure 3B:
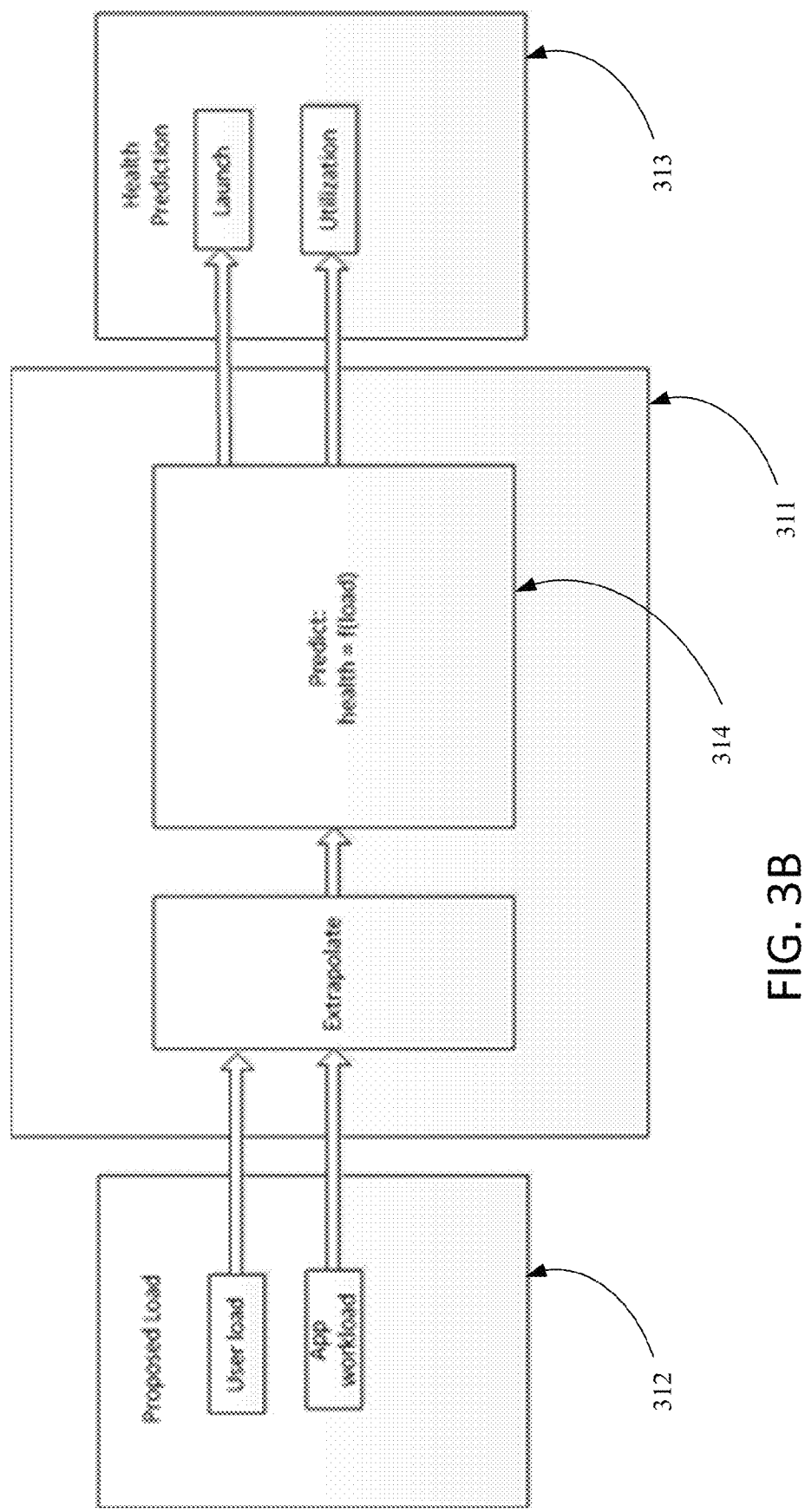
FIG. 3B is a block diagram of components in a predictive engine in accordance with various aspects of the disclosure.

In step 408, the measured load and health values may be provided to a learn module 304 installed on a server 106A. The capacity prediction and learning server 106A may include a neural network (or comparable structure) trained, by the learn module, using incoming and stored load and health measurements. The load value provides the input and the health value provides the output for the neural network, which learns the functional relationship between these values, as illustrated in FIG. 3A. In accordance with various aspects of the disclosure, a neural network system may be used to perform one or more steps of the methods disclosed herein. One example of such a neural network system is the Stuttgart Neural Network Simulator (SNNS). A copy of the SNNS's 338-page user manual (version 4.2) is submitted in an Information Disclosure Statement concurrent with the filing of this disclosure, and that submitted copy of the user manual is herein incorporated by reference in its entirety. A person having ordinary skill in the art after review of the entirety disclosed herein, including the aforementioned SNNS user manual, will understand how to use the SNNS to setup a system for learning and predicting computer server capacity and health metrics.

A neural network system in accordance with various aspects of the disclosure, such as the SNNS, may be installed and executed on a computer system with a compatible machine and operating system. For example, the SNNS may be installed on a server 106A configured as a SUN SparcSt.

ELC,IPC type computer system running a SunOS 4.1.2, 4.1.3 operating system, a SUN SparcSt. 2 type computer system running a SunOS 4.1.2 operating system, a SUN SparcSt. 5, 10, 20 type computer system running a SunOS 4.1.3, 5.2 operating system, a DECstation 3100, 5000 type computer system running a Ultrix V4.2 operating system, a DEC Alpha AXP 3000 type computer system running a OSF1 V2.1 operating system, a IBM-PC 80486, Pentium type computer system running a Linux operating system, a IBM RS 6000/320, 320H, 530H type computer system running a AIX V3.1, AIX V3.2 operating system, a HP 9000/720, 730 type computer system running a HP-UX 8.07 operating system, a SGI Indigo 2 type computer system running a IRIX 4.0.5, 5.3 operating system, or other suitable machines with an appropriate operating system.

Figure 2:
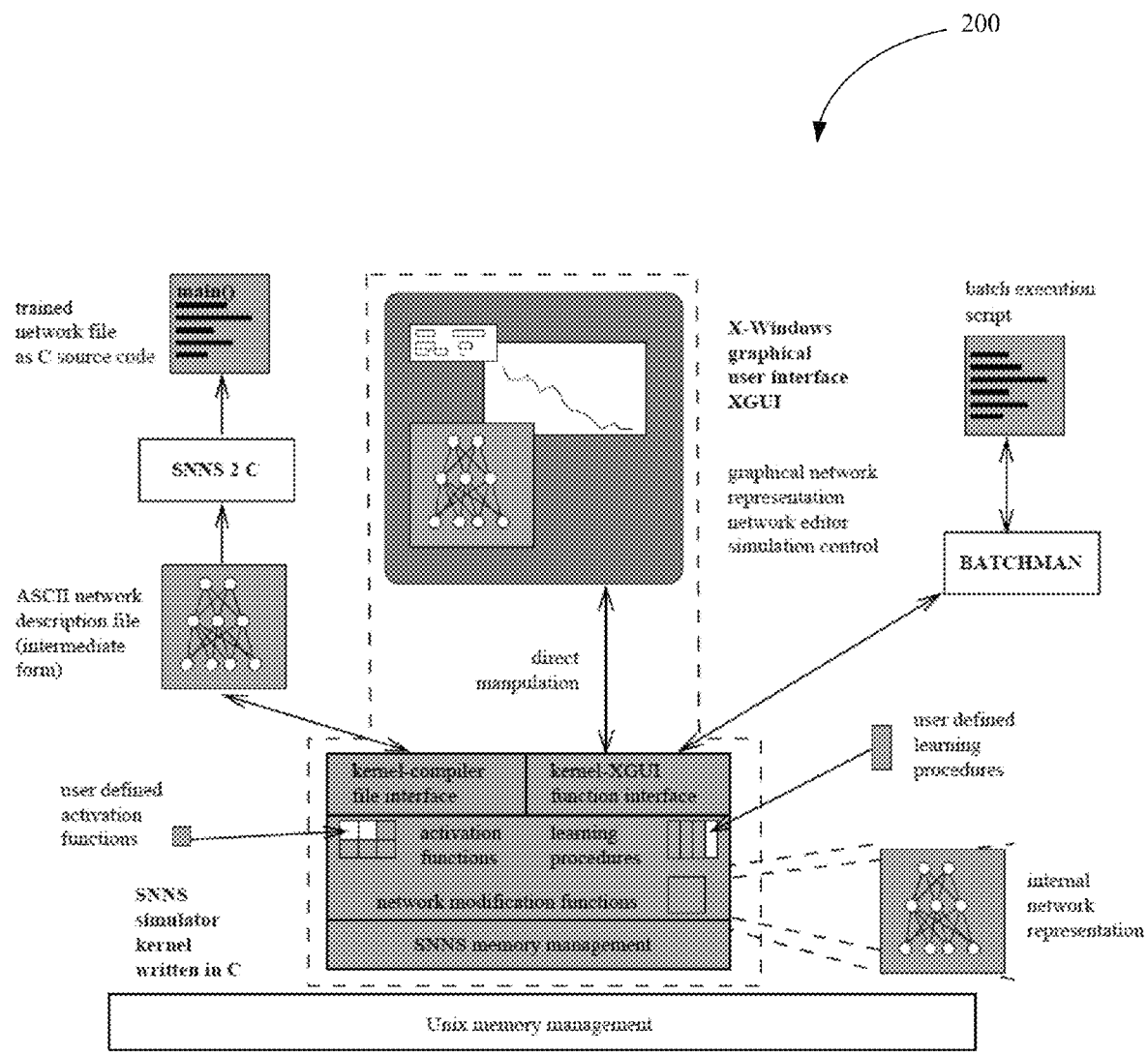
FIG. 2 is a diagram of various components in a known and commercially available neural network product called the Stuttgart Neural Network Simulator.
Figure 5:
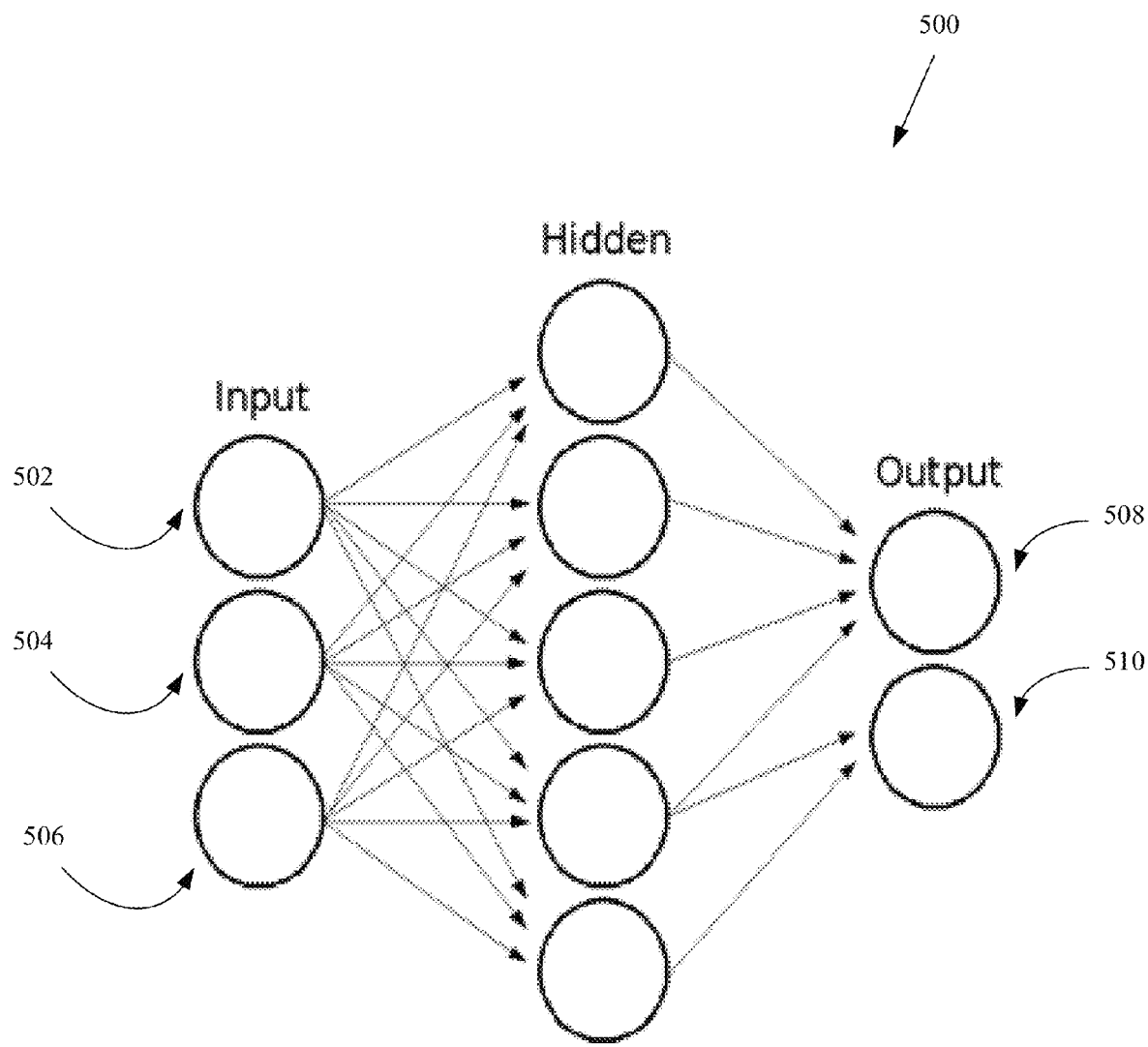
FIG. 5 is an illustrative artificial neural network in accordance with various aspects of the disclosure.

In one example, a neural network comprises: (1) units (e.g., also sometimes referred to as "cells"), and (2) directed weighted links (connections) between them. FIG. 5 shows a diagram of an illustrative neural network. As explained in the SNNS user guide, which was previously incorporated by reference herein, in one illustrative example, the actual information processing within the units may be modeled in the SNNS simulator 200 with activation functions (see, e.g., FIG. 2) and output functions. The activation function may compute the net input of the unit from the weighted output values of prior units, and then compute the new activation from this net input (and possibly its previous activation). The output function may take this result to generate the output of the unit. These functions may be arbitrary functions (e.g., in C programming language) linked to the simulator kernel (see, e.g., FIG. 2) and may, in some examples, be different for each unit. A person having ordinary skill in the art after review of the entirety disclosed herein will appreciate that the preceding description is merely one example of the information processing that may occur in accordance with various aspects of the disclosure. Other machine learning techniques and systems, such as the Rochester Connectionist Simulator and others, may be used, and one or more of the aforementioned steps may be optional or performed in a different order.

Regarding units in the illustrative neural network of FIG. 5, there are typically "three types of units: the units whose activations are the problem input for the net are called input units 502, 504, 506; the units whose output represent the output of the net output units 508, 510. The remaining units are called hidden units, because they are not visible from the outside." See, e.g., SNNS user guide, which was previously incorporated by reference herein. In other words, if a unit has both input and output connections, then it is a "hidden" unit, as illustrated in FIG. 5.

Furthermore, referring to FIG. 5, which a portion of an illustrative artificial neural network, other techniques, such as K-nearest neighbor in (CPU, memory, I/O) space may be used in conjunction with or apart from activations functions of the neural network (e.g., SNNS). For example, the SNNS user's guide demonstrates the following activation function (i.e., "actFunc"), which is computed from the output of preceding units, usually multiplied by the weights connecting these predecessor units with the current unit, the old activation of the unit, and its bias:

$$\alpha_j(t+1) = f_{act}(net_j(t), \alpha_j(t), \theta_j)$$

where:
$\alpha_j(t)$ activation of unit j in step t
$net_j(t)$ net input in unit j in step t
$\theta_j$ threshold (bias) of unit j
The SNNS default activation function Act_logistic, for example, computes the network input simply by summing over all weighted activations and then squashing the result with the logistic function $f_{act}(x)=1/(1+e^x)$. The new activation at time (t+1) lies in the range [0.1]⁴. The variable $\theta_j$ is the threshold of unit j.

In an alternative embodiment, the illustrative neural network may include the use of sites (not shown in FIG. 5) as additional neural network elements. The SNNS user guide explains that "[s]ites are a simple model of the dendrites of a neuron which allow a grouping and different treatment of the input signals of a cell. Each site can have a different site function. This selective treatment of incoming information allows more powerful connectionist models."

In step 410, a predictor module 314 installed on a capacity prediction and learning server 106A may calculate and provide a predicted health value of the system 106B-106N assuming a hypothetical load value (e.g., the current load value incremented by a delta value) provided by module 312. The predictor module 314 makes use of the neural network described above in relation to step 408. The neural network may have been trained using the coupled load-health historical values stored in the data store 128. As such, the neural network is constantly adapting and dynamically updating to identify correlations between load and health. The predictor module may use the dynamic neural network to predict (see ref. 311) the health of the system given inputs of, in one example, CPU utilization 502, memory usage 504, and I/O throughput 506. As a result, the predictor module may analyze the inputs through the neural network and provide outputs (see ref. 313) of, for example, CPU utilization 508 and launch time 510. With reference to block 313, in one example, an average load can be input and extrapolated, possibly by scaling, to a hypothetical value. The learned load-to-health function may produce the health values for the load input.

The generated output of a predicted health value may also include a confidence score/level. As is common with neural network and combinatorial algorithms, the confidence score provides a qualitative scoring of the reliability of the prediction. The confidence of the output may be determined by the sample density provided during learning for a hypothetical load, thus exposing the learning engine to a wide range of load variations allows the learning of a wide range of functional relationships. Confidence score/levels are described below with respect to FIGS. 7A-7G.

In step 412, capacity prediction and learning server 106A may compare the confidence score/level provided by the predictor module with a preset threshold confidence value (e.g., 70%, 80%, or some other percentage less than 100%). The administrator of the plurality of servers 106B-106N (e.g., server cloud) may set the threshold confidence value. If the confidence is low, the server 106A may (in step 414) execute, using a simulator module, a simulated load in accordance with a delta load value. In other words, the simulator module may cause a randomized experiment to be performed on the system where simulated users with simulated application executions are generated against the plurality of server 106B-106N. As explained below with respect to FIGS. 7A-7G, the simulation allows the neural network to train and learn additional correlations between inputs and output, as illustrated in FIG. 5. The capacity prediction and learning server 106A may monitor, in step 404, the health of and load on the system as a result of the simulated load, and as before will record (in step 406) the measurements in the data store 128. As a result of the additional training in step 408, the learn module may adjust its neural network to provide a more confident (i.e., higher confidence score) prediction in the future.

Figure 6:
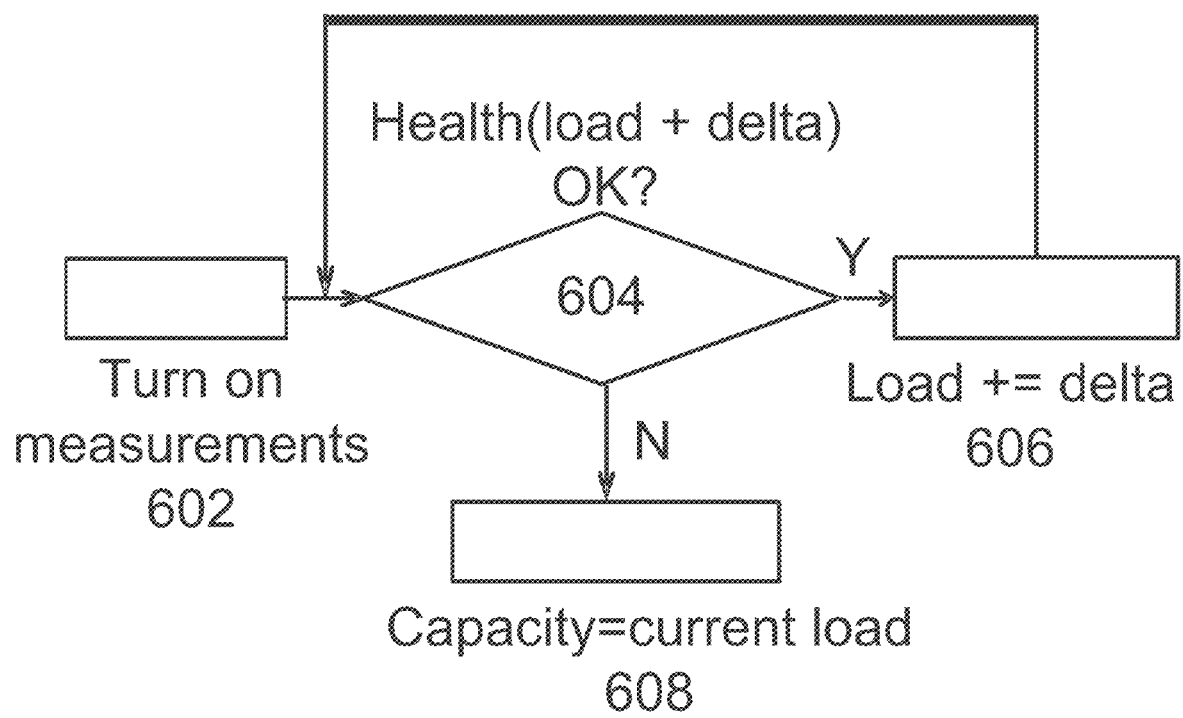
FIG. 6 is a flowchart illustrating one method for testing the health of one or more server computers in accordance with various aspects of the disclosure.

Further elaborating on the simulator module and corresponding steps, FIG. 6 illustrates one method for testing the health of one or more server computers in accordance with various aspects of the disclosure. Similar to step 404 in FIG. 4, the server 106A may turn on health and load monitoring (in step 602) to monitor the server farm's performance under a load. If in step 604, the simulator module finds that the health of the system meets certain minimum requirements (e.g., the requirements provided in step 402), it may add (e.g., simulate) an additional load on the server farm. If that additional load pushes the servers outside of acceptable healthy performance parameters, then in step 608, the capacity of the aggregate servers may be identified as the load at that time. Meanwhile, if the servers are within acceptable health parameters, then the simulated average load may be increased by the delta value (in step 606), and the process repeated to attempt to identify the maximum capacity of the aggregate server machines in the farm while staying within acceptable health performance parameters.

In step 416, the predictor module may return a predicted health value based on the inputted load. The confidence of the prediction may also be greater such that it is above a threshold confidence value. The server 106A may review the predicted health value and determine if the predicted health value is a result of a non-linear response in the system. In a condition commonly described in the art as "whiplash," the system may transition from a linear system into a non-linear system. When in a non-linear zone, the system faces a significantly increased risk that a new load on the system will overwhelm the current capacity provisioned by the system. If the server 106A identifies that the system has transitioned into a non-linear zone/stage, in step 420, a resource provisioning module may be sent a request to provision additional resources (e.g., processors, servers, memory, etc.) to the system 106B-106N. Since the server 106A, in this example, was able to preemptively identify the risk of a whiplash condition before it occurs, and also preemptively allocate resources to the server farm, the risk of running out of capacity has been resolved and/or mitigated.

Meanwhile, in step 418, if the predicted health returned by the predictor module exceeds the preset maximum threshold value, then a resource provisioning module may be sent a request to provision (in step 420) additional resources (e.g., processors, servers, memory, etc.) to the system 106B-106N. For example, if the predicted application launch time for users is slower than desired, the system may trigger the provisioning of additional servers to accommodate the increased load. The resource provisioning module comprises computer-executable instructions to perform the steps described herein, and may be stored in computer memory in a load balancer device 108 or, in some examples, a capacity prediction and learning server 106A.

Figure 7A:
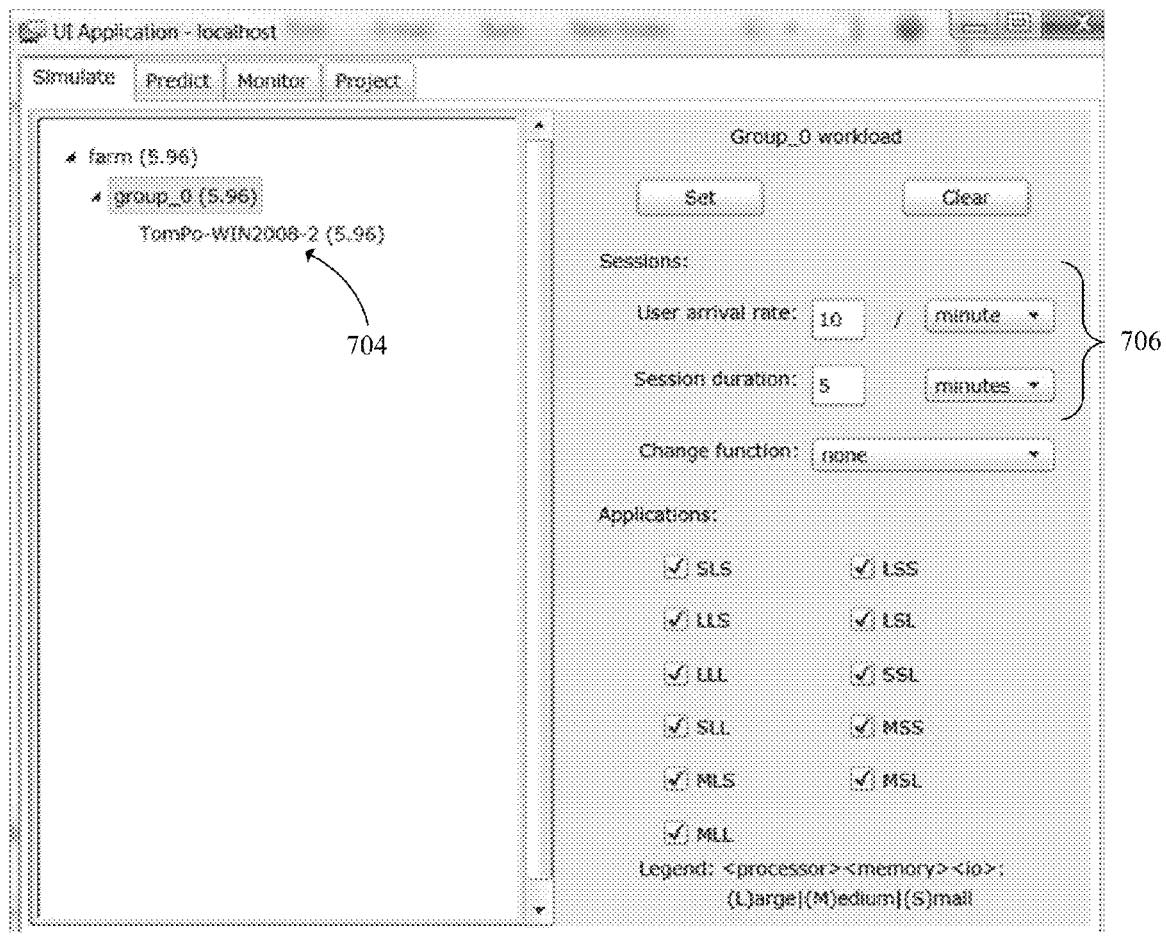
FIGS. 7A-7G are illustrative screenshots of a graphical user interface (GUI) tool for simulating, monitoring, and predicting the load and health of one or more server computers in accordance with various aspects of the disclosure.
Figure 7B:
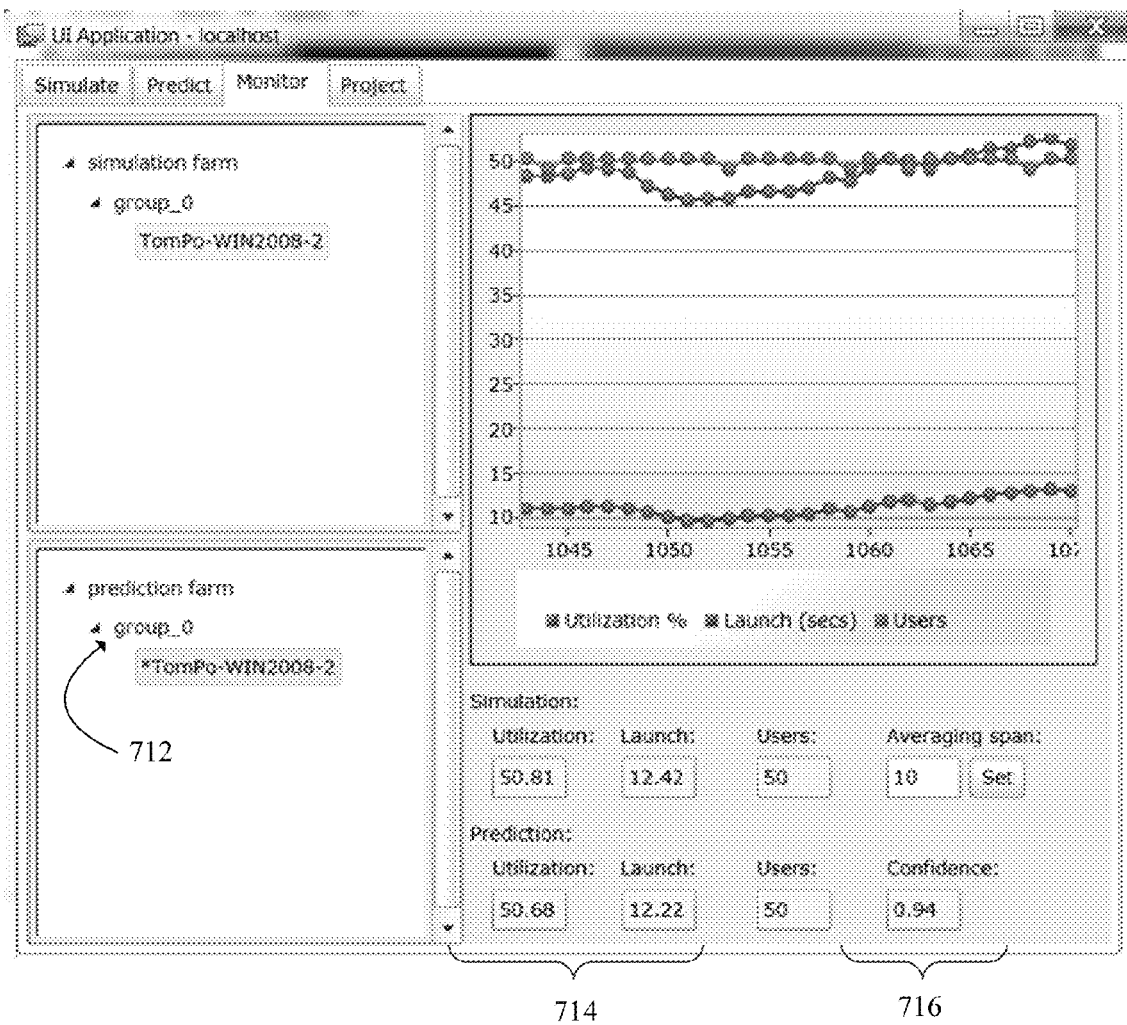

Referring to FIGS. 7A-7G, which include illustrative screenshots of a graphical user interface (GUI) tool for simulating, monitoring, and predicting the load and health of one or more server computers in accordance with various aspects of the disclosure, three illustrative scenarios are shown. First, corresponding to FIGS. 7A and 7B, a simulation server machine 704 may be setup with a workload (i.e., load) of fifty users (e.g., "user arrival rate" times "session duration" 706) with varying application processing needs with respect to CPU, memory, and I/O usage. When the simulation 702 is run, a learn module 304 and predictor module 314 on a cloned sever machine 712 will train a neural network to predict the capacity (e.g., health) of the server machine. In FIG. 7B, the predictor module 314 generates predicted health metrics 714 indicating a confidence of 94% (see ref 716) based on a given input load.

Figure 7C:
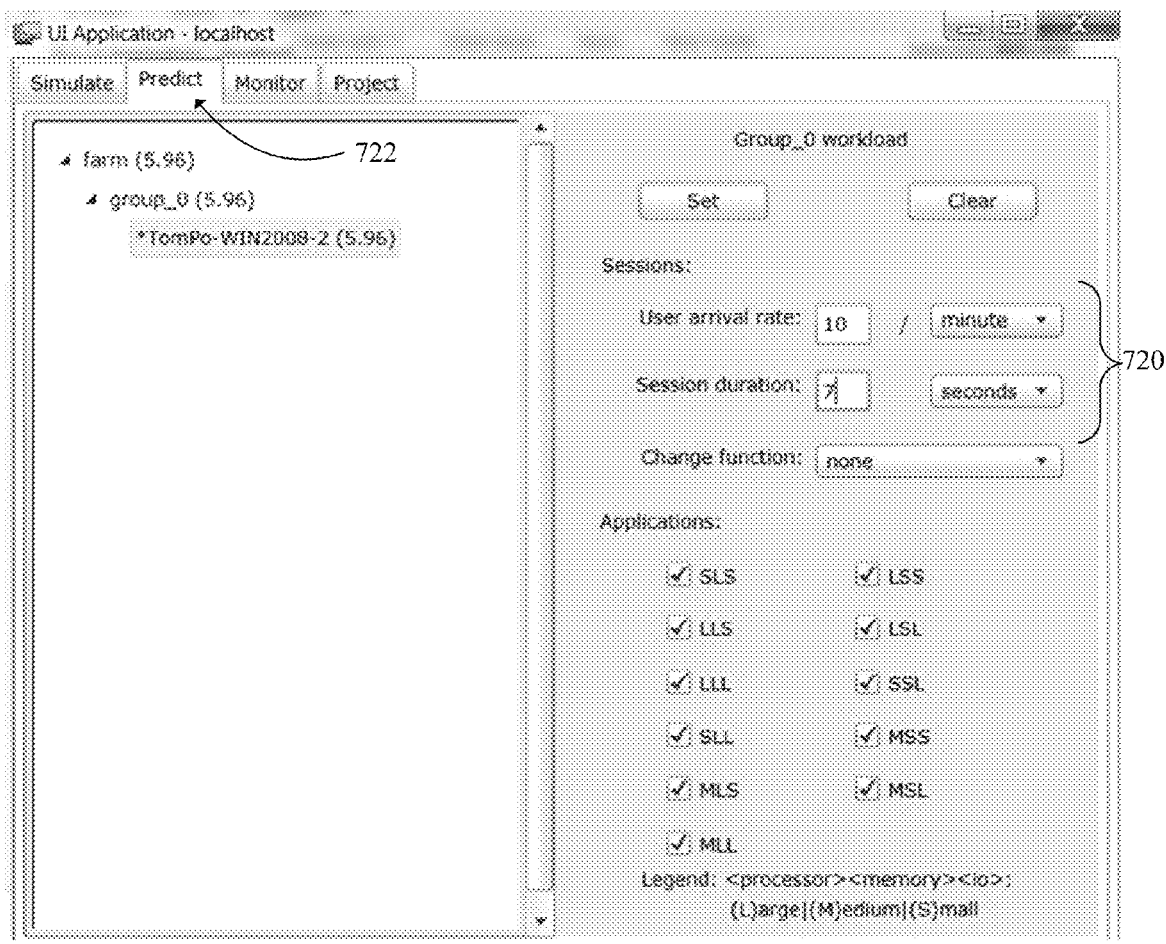
Figure 7D:
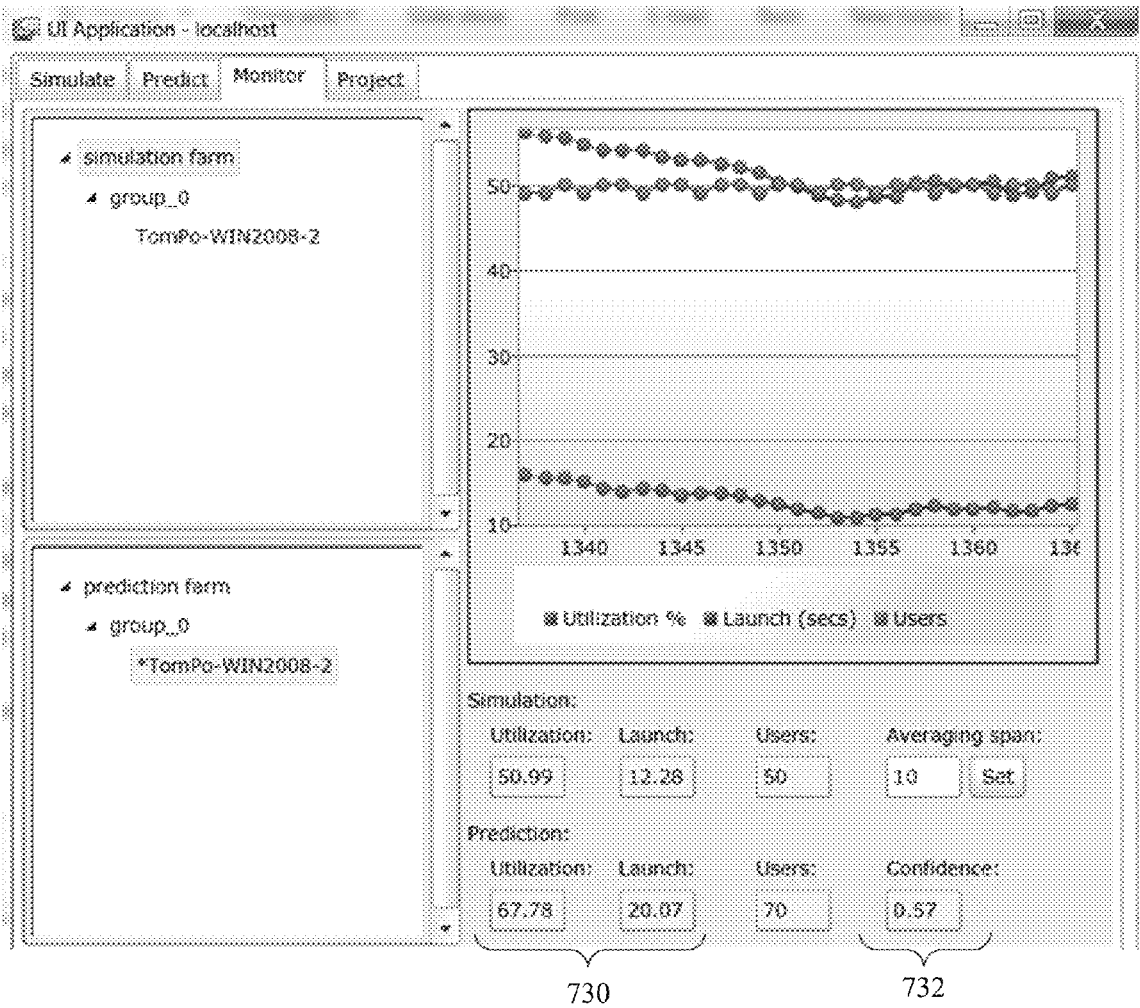
Figure 7E:
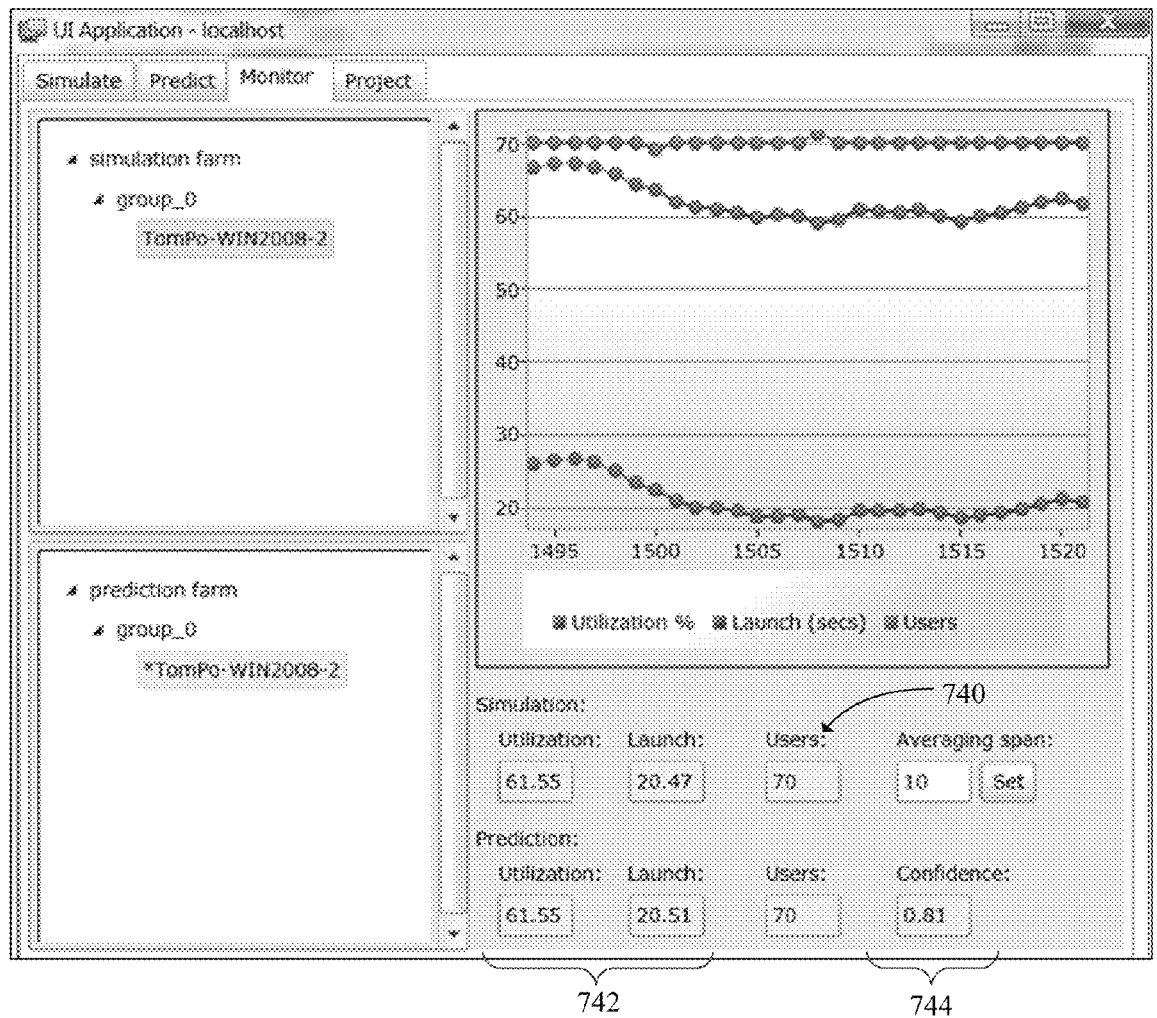

In a second example, corresponding to FIGS. 7C, 7D, and 7E, the server machine 704 may setup a hypothetical load 720 of seventy users with varying processor, memory, I/O usage to predict 722 the health of the plurality of servers executing the users' applications. The predictor module, using the trained neural network, predicts the health metrics 730 of the server farm with 57% confidence 732. To check the predictions, a simulation may be performed with a test setup 740 of seventy user to check the predictions 742, 744 against the simulated results. Based on the additional training the learn module and predictor module received, the predictor module may now predict with greater confidence (e.g., 81%) the health of the server farm based on the given input loads.

Figure 7F:
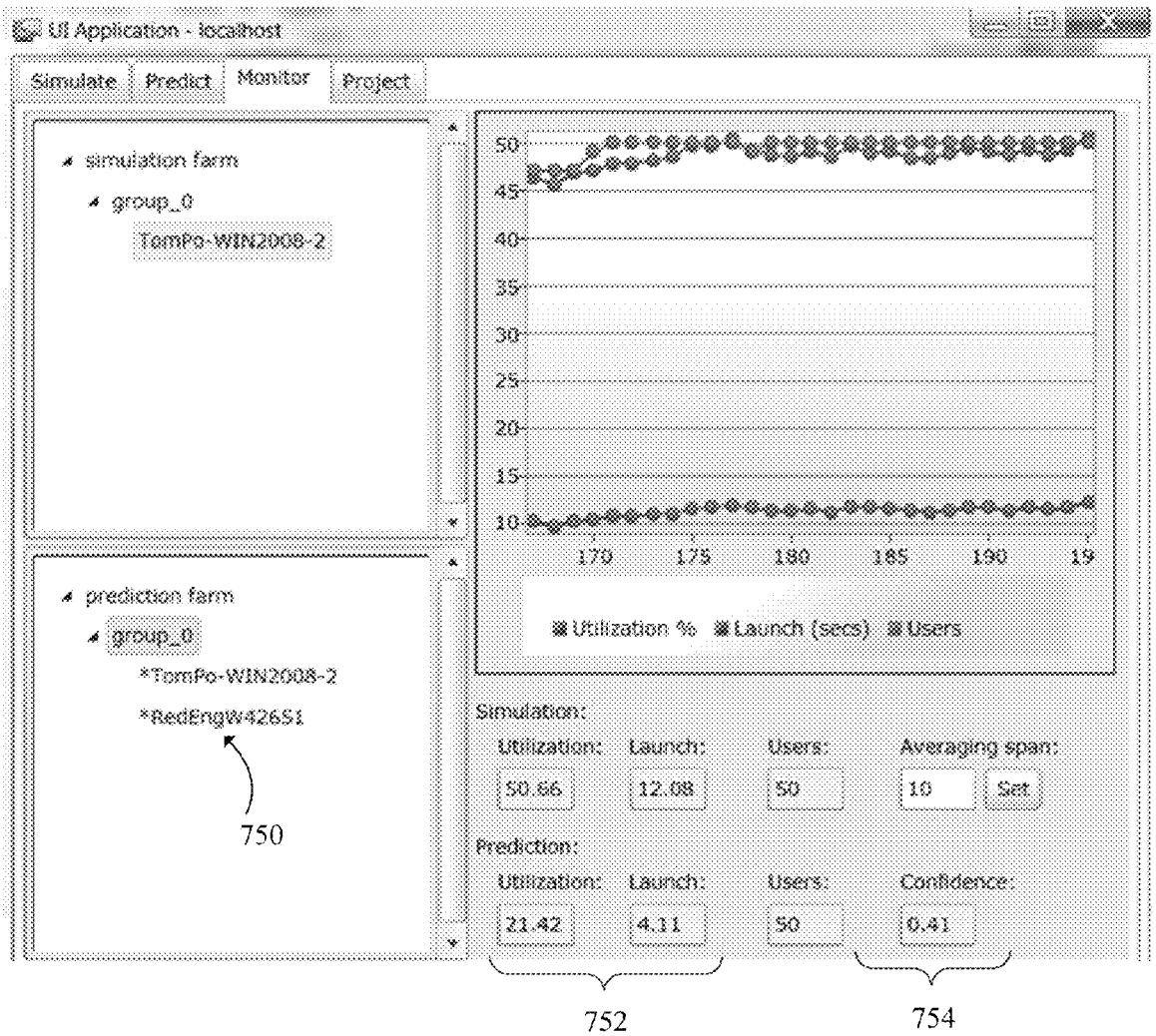
Figure 7G:
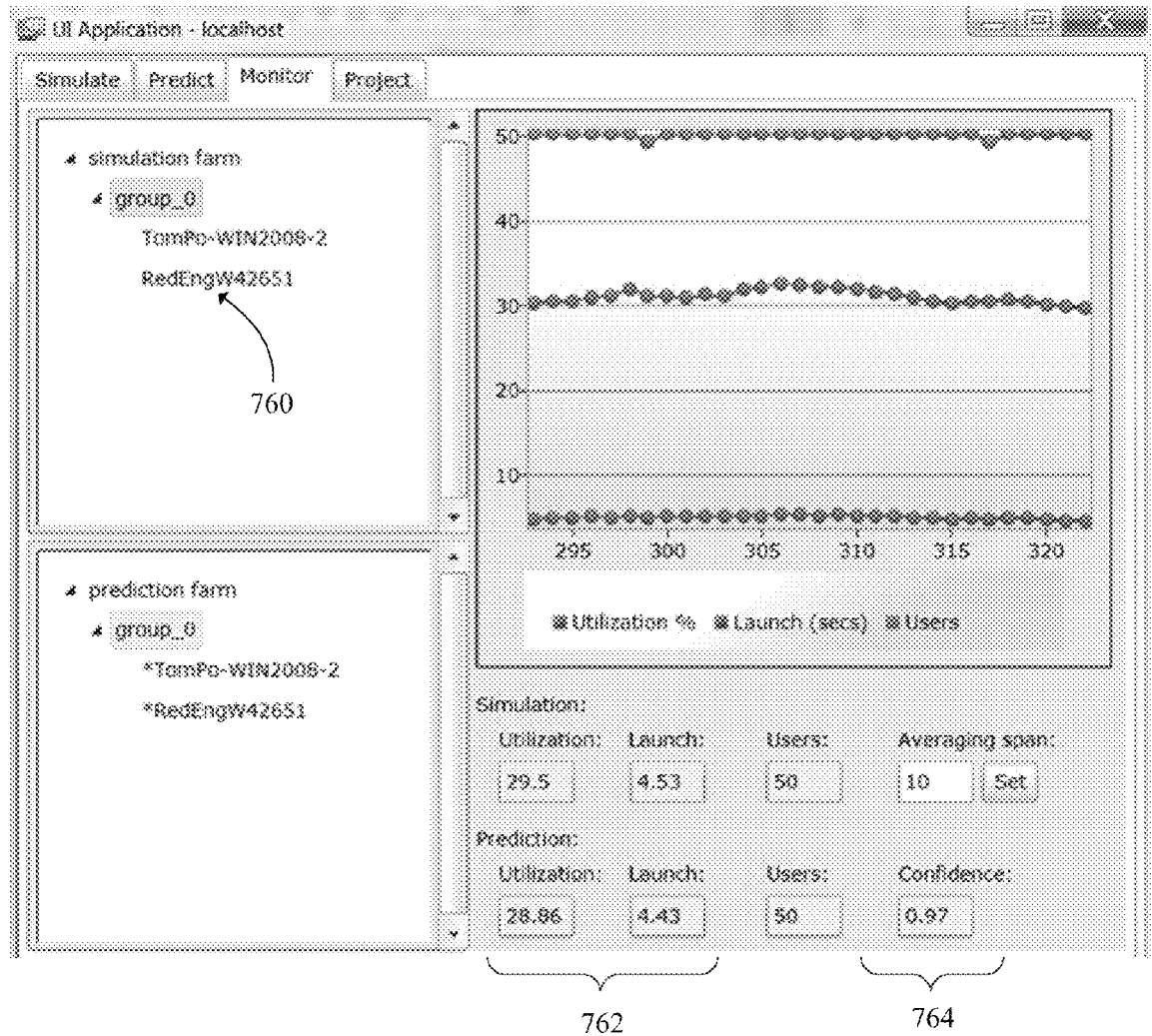

Finally, in a third example corresponding to FIGS. 7F and 7G, assuming that the health metrics are outside the desired range for a test group of fifty users, the predictor module 314 may be used to predict the updated health metrics if an additional resource (e.g., server 750) was added to the server farm. In this case, the predictor module can predict with only 41% confidence 754 the health metrics 752 of the updated server farm with an additional server. To check the prediction, additional training may be performed and a simulation conducted on a cloned server farm 760 with two server machines. As shown in FIG. 7G, the predictor module may now predict with greater accuracy (e.g., 97% confidence 764) the health metrics 762 of the system given the particular input load.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile). In addition, although method steps have been depicted in flowcharts in a particular order, the steps may be performed an order different than that shown, and one or more steps may be optional or omitted in accordance with various aspects of the disclosure.

We claim:

1. A system comprising:
    a plurality of server machines, each comprising at least one computer processor, one or more computer memories, and an input-output bus;
    a data store storing corresponding load and health measurements of the plurality of server machines;
    a neural network configured to receive the corresponding load and health measurements as inputs;
    a memory of a computing device storing a learn module that, when executed by a processor of the computing device, causes an update to the neural network using inputs of corresponding load and health measurements of the plurality of server machines;
    the memory of the computing device storing a predictor module that, when executed by the processor of the computing device, generates a predicted health value of the plurality of server machines, using the updated neural network, given a hypothetical increased load value, wherein the predicted health value comprises a confidence score, wherein the predicted health value indicates a linear response when the load on the system is at a first value, and the predicted health value indicates a non-linear response when the load on the system is at a second value greater than the first value; and the memory of the computing device storing a simulator module that, when executed by the processor of the computing device, generates a simulated load on the plurality of server machines in accordance with hypothetical increased load value.

2. The system of claim 1, wherein the load measurements comprise a processor utilization measurement, memory usage measurement, and input-output throughput rate measurement.

3. The system of claim 1, wherein the health measurements comprise at least one of: application launch time, and response time to user requests.

4. The system of claim 1, wherein the learn module trains the neural network to correlate the load measurement of the plurality of server machines with the corresponding health measurement of the plurality of machines, including historical load and corresponding health measurements stored in the data store.

5. The system of claim 1, wherein the computing device comprises a load balancer device in communication with the plurality of server machines.

6. The system of claim 5, further comprising:
a memory of the load balancer device storing a resource provisioning module that, when executed by the processor of load balancer device, causes additional resources to be added to the plurality of server machines when the predicted health value shows a non-linear response in the plurality of server machines.

7. The system of claim 1, further comprising:
the memory of the computing device storing a resource provisioning module that, when executed by the processor of the computing device, causes additional servers to be added to the plurality of server machines when the predicted health value shows a non-linear response in the plurality of server machines.

8. The system of claim 1, wherein the simulator module comprises computer-executable instructions that, when executed by the processor of the computing device, further cause the system to:
determine whether the confidence score of the predicted health value is above a threshold confidence value;
if the confidence score is not above the threshold confidence value, then execute a simulated load in accordance with a delta load value;
else if the confidence score is at or above the threshold confidence value, then determine if the predicted health value is a result of a non-linear response in the system;
if the response is non-linear, then request additional resources for the plurality of servers; and
if the predicted health value is above the maximum threshold value, then request additional resources for the plurality of servers.

9. A non-transitory computer-readable medium storing computer-executable instructions that, when executed by one or more processors of a computer system, cause the system to:
receive a minimum value corresponding to a health of at least one server machine;
monitor the health of the system and a load on the at least one server machine;
store the load and health measurements in a data store;
provide the load and health measurements to a learn module comprising a neural network, wherein the neural network is trained using the load and health measurements;
obtain, from a predictor module, a predicted health value of the at least one server machine given a load value incremented by a delta value;
determine whether confidence in the predicted health value is above a threshold confidence value;
if the confidence is not above the threshold confidence value, then execute, by a simulator module, a simulated load on the at least one server machine in accordance with the delta load value, wherein the predicted health value indicates a linear response when the load on the system is at a first value, and the predicted health value indicates a non-linear response when the load on the system is at a second value greater than the first value;
else if the confidence is above the threshold confidence value, then determine if the predicted health value results in a non-linear response in the at least one server machine; and
if the response is non-linear, then request additional resources for the at least one server machine.

10. The computer-readable medium of claim 9, storing further computer-executable instructions that, when executed by one or more processors of the computer system, cause the system to:
correlate, using the neural network, the load measurements of the system with the corresponding health measurements of the system, including historical load and corresponding health measurements stored in the data store.

11. The computer-readable medium of claim 9, wherein the load measurements comprise processor utilization measurement, memory usage measurement, and input-output throughput rate measurement.

12. The computer-readable medium of claim 9, wherein the health measurements comprise at least one of: application launch time, and response time to user requests.

13. The computer-readable medium of claim 9, wherein the system comprises a load balancer device, and the request for additional resources is executed by a resource provisioning module in the load balancer device.

14. The computer-readable medium of claim 9, wherein the additional resources are one or more additional server machines added to the at least one server machine, and the computer-readable medium storing further computer-executable instructions that, when executed by the one or more processors of the computer system, cause the system to:
request additional server machines after determining that the predicted health value is below the received minimum value corresponding to the health of the at least one server machine.

15. The computer-readable medium of claim 9, wherein the predictor module uses the neural network to determine the predicted health value and confidence.

16. A method comprising:
receiving a value corresponding to a maximum threshold value of a health of a system;
monitoring, by one or more computer processors, the health of the system and a load on the system;
storing, by the one or more computer processors, the load and health measurements in a data store;
providing, by the one or more computer processors, the load and health measurements to a learn module comprising a neural network, wherein the neural network is trained using the load and health measurements;
obtaining, by the one or more computer processors from a predictor module, a predicted health value of the system, wherein the predicted health value indicates a linear response when the load on the system is at a first value, and the predicted health value indicates a non-linear response when the load on the system is at a second value greater than the first value;

if the predicted health value indicates a non-linear response, then requesting, by the one or more computer processors, additional resources for the system; and if the predicted health value is above the maximum threshold value, then requesting, by the one or more computer processors, additional resources for the system.

17. The method of claim 16, wherein the obtaining of the predicted health value of the system is for a load value incremented by a delta value, further comprising:

determining, by the one or more computer processors, that confidence in the predicted health value is below a threshold confidence value; and executing, by the one or more computer processors using a simulator module, a simulated load on the system in accordance with the delta load value.

18. The method of claim 16, wherein the predictor module uses the neural network to determine the predicted health value and confidence.

19. The method of claim 16, wherein the request for additional resources is executed by a resource provisioning module in a load balancer device.

* * * * *